June 18, 1946.  A. TEMPLETON  2,402,465
BALE LIFTER AND CONVEYER
Filed Aug. 23, 1944  2 Sheets-Sheet 1
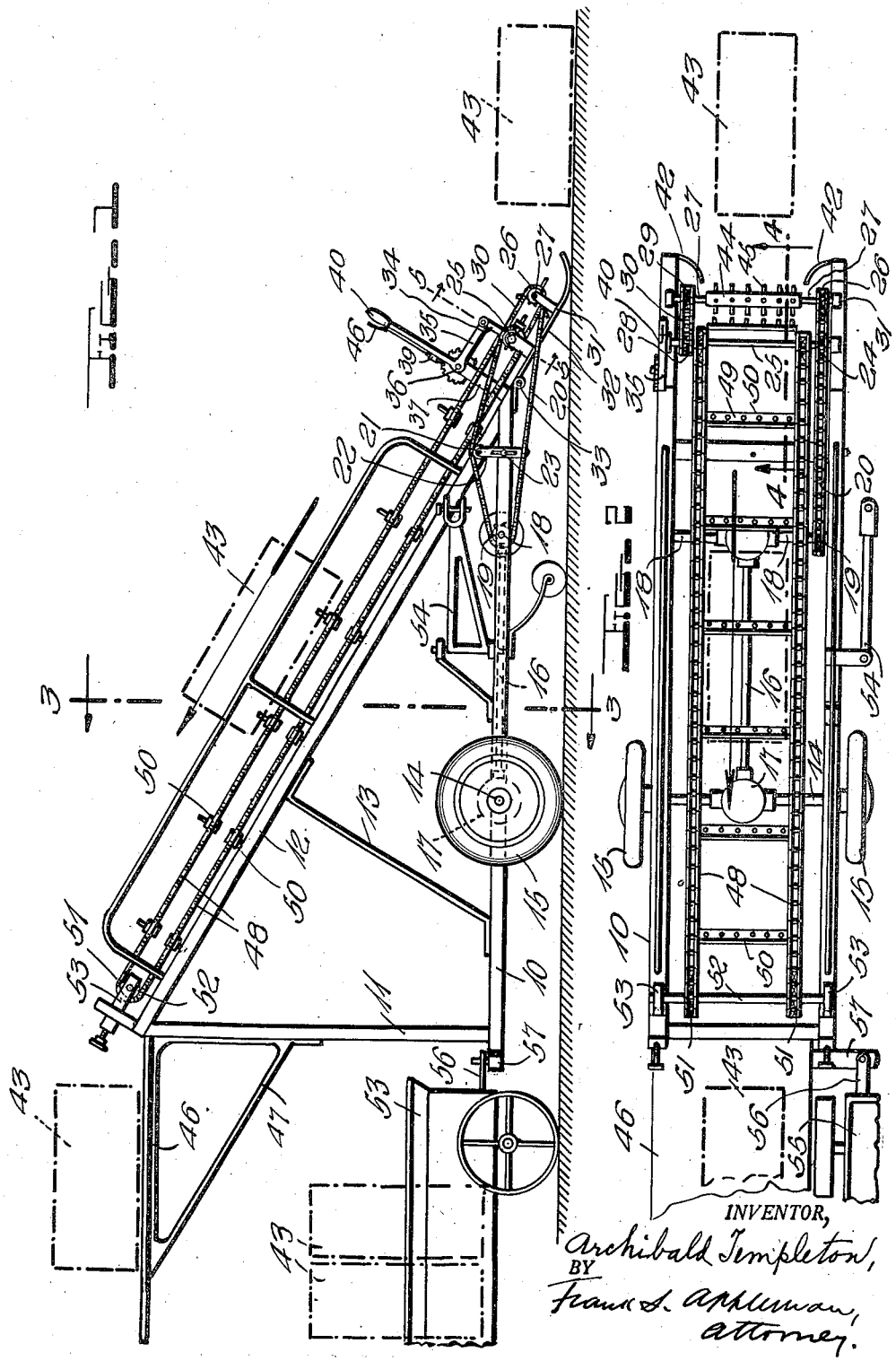
INVENTOR,
Archibald Templeton,
BY
Frank S. Appleman,
attorney.

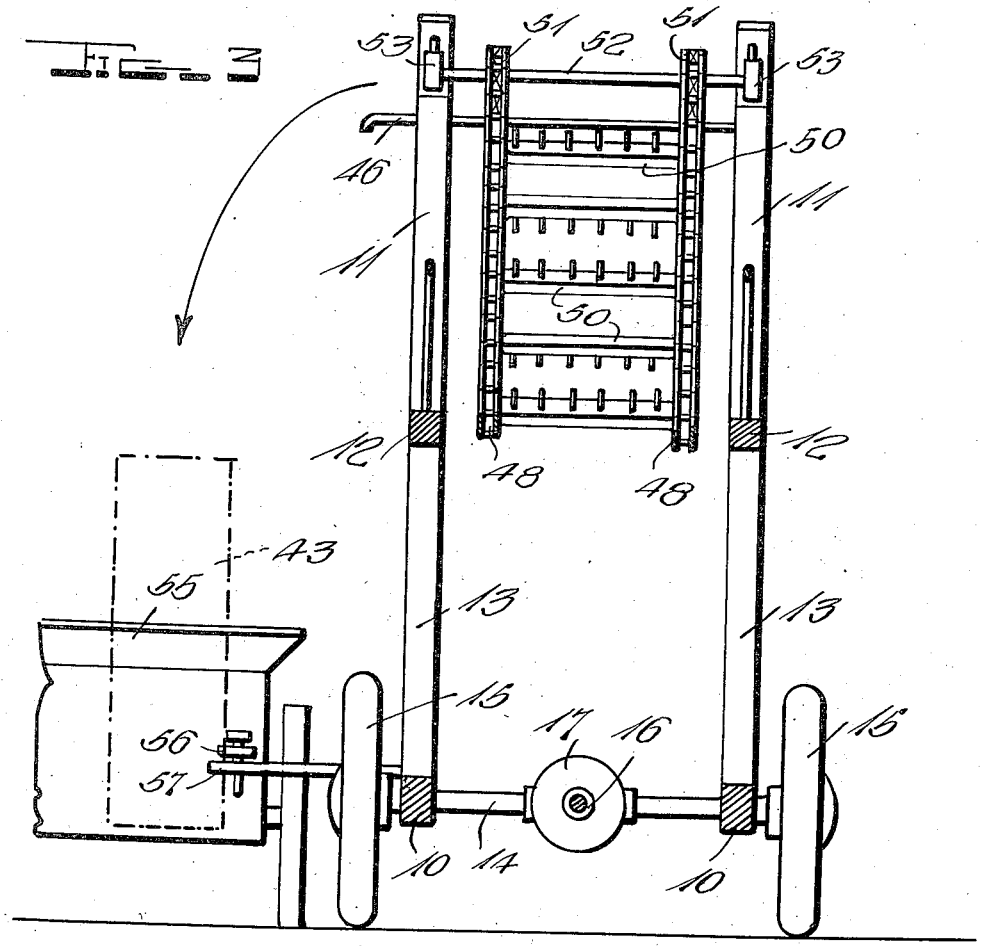
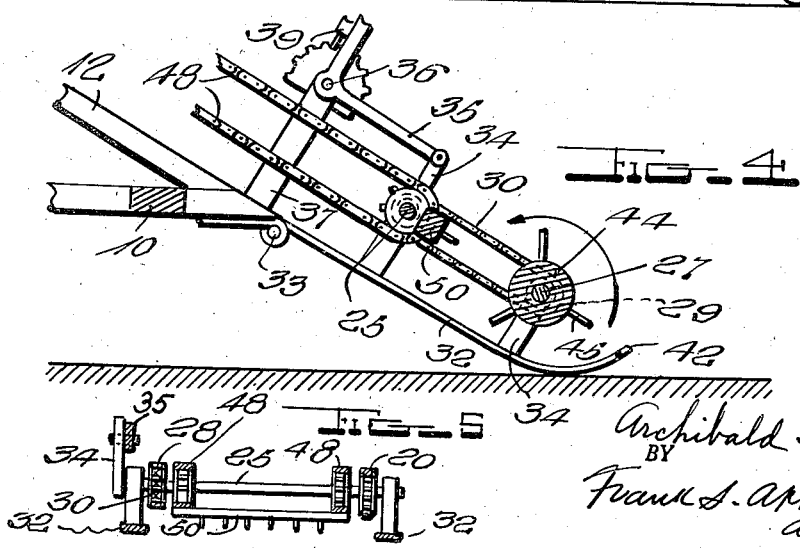

Patented June 18, 1946

2,402,465

UNITED STATES PATENT OFFICE 2,402,465

BALE LIFTER AND CONVEYER

Archibald Templeton, Evansville, Wis.

Application August 23, 1944, Serial No. 550,737

1 Claim. (Cl. 198—9)

This invention relates to agricultural implements, and particularly to a machine for lifting bales of hay or other commodity which has been deposited by a baler in its travel over a field, and it is an object of this invention to provide novel means for dislodging the bales and transferring them to a conveyer, by which the bales are elevated and deposited in a trailer truck or on a platform from which they are transferred to the trailer truck.

It is a further object of this invention to provide a bale transfer having traction wheels which are geared to mechanism for operating the conveyer as well as the bale lifting instrumentality; and it is furthermore an object to provide a bale lifting instrumentality which is adjustable with relation to the field over which the bale lifter is operated.

It is a still further object of the invention to provide means by which a tractor is hitched to the bale lifter so that the bale lifter may be pulled or propelled by the tractor.

It is furthermore an object of the invention to provide means by which the bale may be positioned in order that the bale will be properly located with relation to the lifting mechanism as it moves into engagement with the bale; and it is furthermore an object to produce a bale lifter of the character indicated which has proven efficient and satisfactory in use and comparatively inexpensive to produce and maintain.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 illustrates a view in side elevation of the bale lifter and the associated parts;

Figure 2 illustrates a plan view thereof;

Figure 3 illustrates a sectional view on the line 3—3 of Fig. 1;

Figure 4 illustrates a sectional view on the line 4—4 of Fig. 2; and

Figure 5 illustrates a sectional view on the line 5—5 of Fig. 1.

In these drawings the conveyer has a rectangular frame 10 which is approximately horizontally positioned, and the side frame members support posts or uprights 11, on which the outer ends of the diagonally disposed frame members 12 are supported, the opposite ends of the said frame members being supported on the front end of the frame 10 and, in order to strengthen the structure, braces such as 13 may be interposed between the frame 10 and the frame members 12. The frame 10 is supported on an axle 14 that rotates in suitable bearings on the frame, and the said axle is supported by traction wheels 15 which serve to rotate the axle. There is a longitudinally extending shaft 16 geared to the axle in the housing 17, this gearing being of the ordinary beveled type which communicates the movement of the axle to the shaft 16, and the said shaft is furthermore geared to a shaft 18 journalled in appropiate bearings on the frame 10, and the connections between the shafts 16 and 18 are of the ordinary beveled gear type which need not, it is thought, be illustrated in detail.

The shaft 18 has a sprocket wheel 19 mounted on it and it is engaged by a sprocket chain 20 which operates over an idler 21 of an adjustable bracket 22 by which the tension of the chain may be regulated, by reason of the fact that the bracket is held in adjusted positions by a fastening 23, such as a set screw or the like. The chain operates in engagement with a sprocket wheel 24 on a shaft 25 and around a sprocket wheel 26 on a shaft 27; and furthermore, the shaft 25 has another sprocket wheel 28 and the shaft 27 has a sprocket wheel 29, the said wheels 28 and 29 being engaged by a sprocket chain 30, as this arrangement serves to stabilize the drive between the shafts 25 and 27 so that both ends of the shaft 27 are power driven. The shaft 27 is rotatable in bearings of the standard 31 at each end, and each of the standards is carried by a shoe 32, each of which is oscillatably mounted on the front end of the frame by a hinge 33, or the like, so that by this mounting the shoe may yield to uneven terrain, or the shoes may be lifted so that they are free of the field when travelling in an inoperative state.

The means by which the shoes and the bale lifting instrumentalities are lifted and supported in elevated position comprise a link or arm 34 which is associated with a shaft 25 in such a way that it will serve to lift the shaft when the bell crank lever 35 is oscillated on its pivot 36, the said lever being mounted on a post or standard 37 rising from the frame at one side of the structure. There is also a segmental rack 38 stationary with respect to the post 37 with relation to which the bell crank lever moves, and the bell crank lever has a ratchet 39 which engages the segmental rack to hold the bell crank lever in different positions of adjustment; it being shown that the bell crank lever has a handle 40 and that the ratchet has a handle 41 juxtaposed with relation to the handle 40 so that the ratchet and bell crank lever may be operated simultaneously and held in different positions when the ratchet is released.

The forward ends of the shoe have inwardly curved arms 42 that serve to move the bale 43 if it is displaced with relation to the line of travel of the bale lifter, it being obvious that the said arms would engage the bale and move it so that it would more nearly be in line with the direction of travel of the lifter.

The shaft 27 has a drum 44 in which ends of spikes 45 are imbedded, which spikes radiate from the drum and serve to impinge the material of the bale so that it is displaced, lifted and transferred to a conveyer, to be presently described, and it is obvious from the description of the sprocket chains and wheels that this bale lifting instrumentality is operated in conjunction with the operation of the conveyer.

The frame may have a platform 46 suitably supported by the posts or uprights 11 with a suitable brace 47.

The conveyer to which the bales are delivered by the lifter comprises, in the present embodiment of the invention, sprocket chains 48 having cross members or bars 49 with teeth 50 which imbed themselves in the bale as it delivered to the conveyer and the bale is thereby carried to the outer end of the conveyer; it being shown that the conveyer chains operate over sprocket wheels 51 on an idler shaft 52 which rotates in suitable bearings of a yoke 53 adjustable on the frame at the outer end of the structure, so that it is obvious that when the bale lifter and conveyer are operated through power derived from the traction wheels the coacting members are effective to lift and transfer the bales.

The machine so far described is to be drawn or propelled by a tractor and a suitable tractor hitch 54 is illustrated as associated with one side frame and, as this hitch may be modified to suit particular requirements, it is believed unnecessary to describe the same in detail, although it is clearly illustrated in Figures 1 and 2.

It is the purpose of the inventor that the bales shall be delivered to the platform and from thence to a truck or wagon 55, although under certain conditions the platform may be omitted and the delivery of the bales may be made directly to the truck which is to be moved as the conveyer travels. A means for coupling a truck or trailer to the conveyer is illustrated as including a drawbar 56 connected to the trailer, the said drawbar being appropriately connected to the frame of the conveyer as illustrated at 57. Since the trailer may be connected to the frame of the conveyer in any appropriate way, it is believed unnecessary for an understanding of the invention by one skilled in the art to illustrate or describe the same, as there are many examples in the art of such means and couplings.

I claim:

In a bale lifter and conveyer, a wheeled frame having an inclined portion, a conveyer comprising side chains with cross members having teeth mounted for movement along the inclined portion of the frame, means carried by the inclined portion of the frame for adjusting the tension of said conveyer, means for driving said conveyer, a bale lifter for elevating and moving the bales to the conveyer, said bale lifter comprising a rotatably mounted drum having teeth for impinging the bale and transferring it to the conveyer, shoes hingedly connected to the frame and having curved outer ends, guide means for the bale carried by said outer ends in advance of the drum, a bearing for the drum carried by each shoe, a shaft for the conveyer having bearings carried by the shoe, a sprocket chain drive between said drum and conveyer shaft, a second sprocket chain drive connecting the conveyer driving means with the conveyer shaft and drum, means for varying the tension of said latter chain drive, and means for elevating and retaining the shoe in different elevated positions.

ARCHIBALD TEMPLETON.